United States Patent
Kiiskinen

(10) Patent No.: US 7,163,151 B2
(45) Date of Patent: Jan. 16, 2007

(54) IMAGE HANDLING USING A VOICE TAG

(75) Inventor: Arto Kiiskinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/016,193

(22) Filed: Dec. 17, 2004

(65) Prior Publication Data
US 2005/0161510 A1  Jul. 28, 2005

(30) Foreign Application Priority Data
Dec. 19, 2003  (GB) ................. 0329504.5

(51) Int. Cl.
H04N 5/76  (2006.01)

(52) U.S. Cl. .............. 235/472.01; 348/207.99; 348/231.2

(58) Field of Classification Search ........ 235/472.01–472.03; 704/270; 348/207.99, 231.2
See application file for complete search history.

(56) References Cited

U.S. PATENT DOCUMENTS

| | | | | |
|---|---|---|---|---|
| 4,389,109 A | * | 6/1983 | Taniguchi et al. | 396/56 |
| 5,737,491 A | * | 4/1998 | Allen et al. | 704/270 |
| 6,167,469 A | * | 12/2000 | Safai et al. | 710/62 |
| 6,462,778 B1 | * | 10/2002 | Abram et al. | 348/239 |
| 6,469,738 B1 | * | 10/2002 | Hayashi | 348/231.99 |
| 6,580,838 B1 | * | 6/2003 | Oliver et al. | 382/313 |
| 6,829,624 B1 | * | 12/2004 | Yoshida | 707/205 |
| 2003/0063321 A1 | | 4/2003 | Inoue et al. | 358/302 |
| 2003/0189642 A1 | * | 10/2003 | Bean et al. | 348/207.1 |

FOREIGN PATENT DOCUMENTS

EP  1 014 338 A1  6/2000

* cited by examiner

Primary Examiner—Michael G. Lee
Assistant Examiner—Jamara A. Franklin
(74) Attorney, Agent, or Firm—Harrington & Smith, LLP

(57) ABSTRACT

A method of handling images in an image capturing device, said method including the steps of capturing an image, receiving a voice tag and matching the received voice tag with a stored voice tag, said stored voice tag having an instruction associated therewith for handling an image, and handling the image in accordance with the instruction corresponding to the received voice tag.

28 Claims, 3 Drawing Sheets

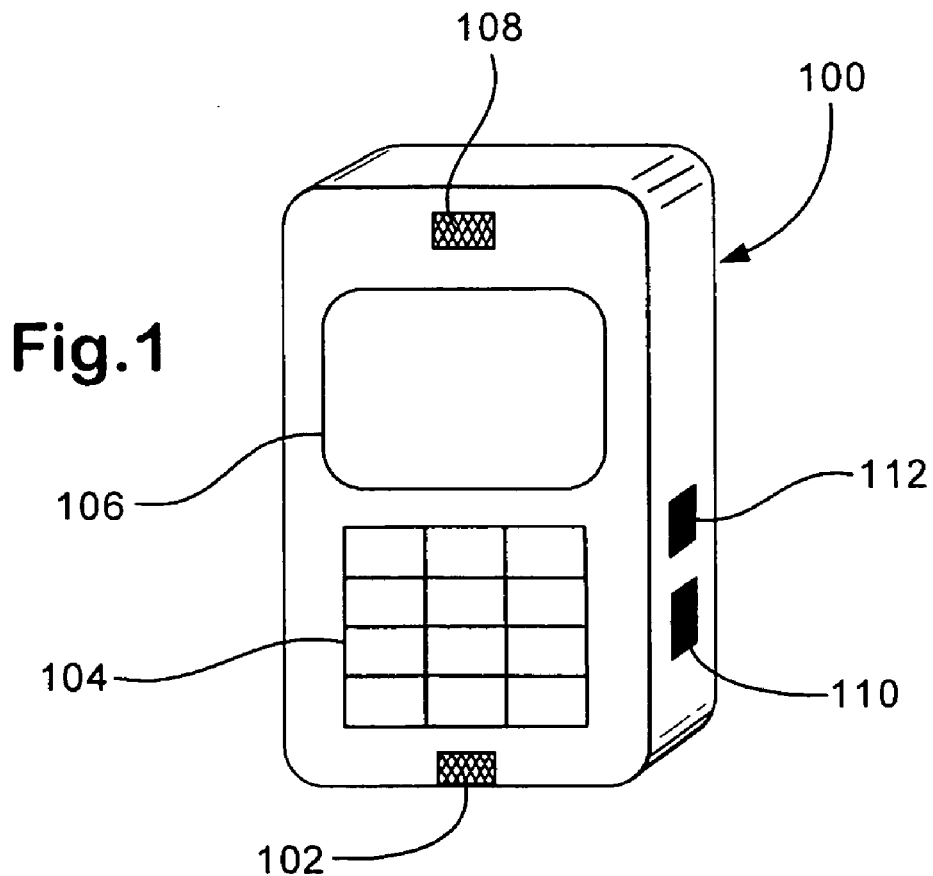
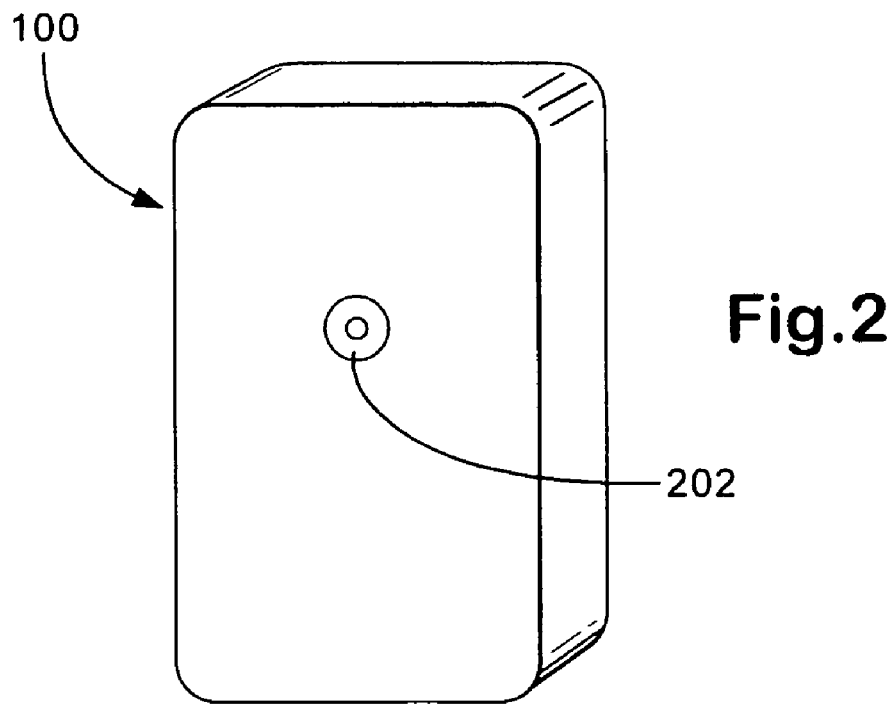

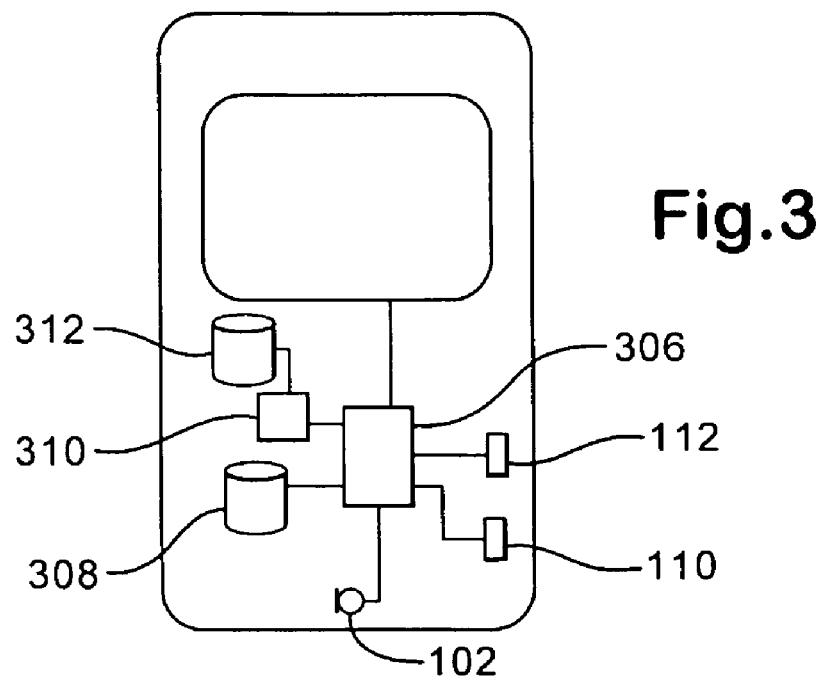
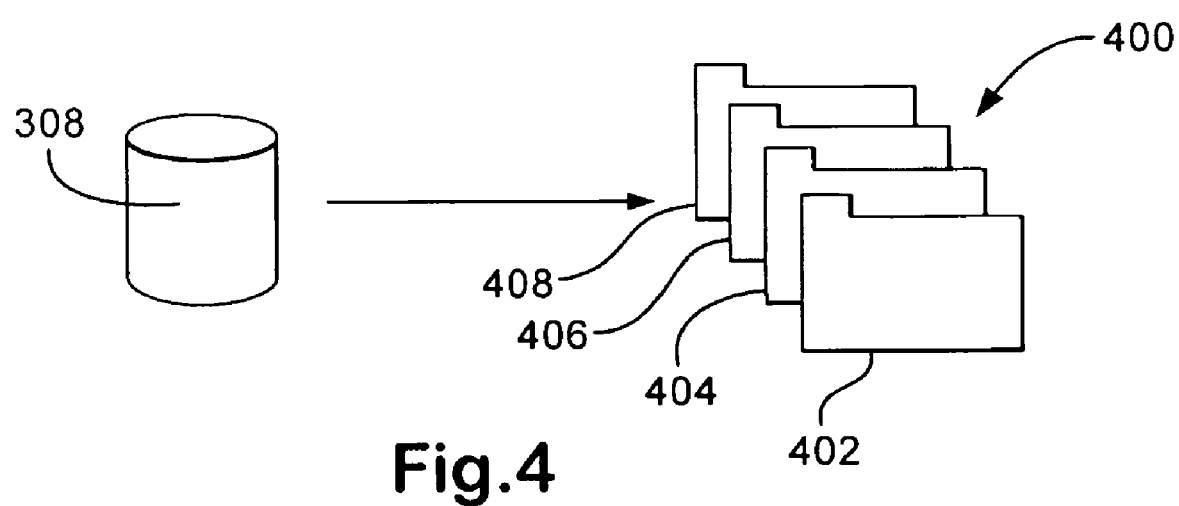

IMAGE HANDLING USING A VOICE TAG

FIELD OF INVENTION

The present invention relates to a method of handling images on a voice dialling enabled image capturing device, and particularly, but not exclusively, to a method of handling images on a camera phone.

BACKGROUND TO THE INVENTION

Mobile phones today include many applications such as text messaging functions, diaries, notepads and radios. Many mobile phones also include a camera function allowing a user to take photographs. Typically, the camera unit itself may be built into the mobile phone or may be attached to it. Mobile phones with camera functions are commonly referred to as camera phones.

When any digital imaging device, such as a camera phone is used to capture an image, the image is stored on the device in the device's internal memory. Usually, the memory is divided into a series of folders or files, each of which can be used to store images and other data. Some devices store a fixed number of images in a single folder assigned for images and then automatically create new folder for further images as each folder fills up. Alternatively, a user may arrange and store images into separate predefined folders after an image has been captured.

For example, when an image is captured on a camera phone, the image is displayed on the screen of the camera phone to allow the user to review the image and decide what they wish to do with it, usually, delete or save it. Whilst the image is displayed or sometime after the image has been displayed, the user is presented with a list of options available for handling the captured image. The user can utilise the menus and options displayed on the screen in conjunction with the navigation controls, which comprise the user interface of the camera phone, to manually specify a specific folder in which to store the captured image. The camera phone may also give the user the option to delete the image without storing it if the user does not want it.

For example, a user may have predefined folders marked "vacation", "work", "friends" and "miscellaneous". After an image is captured, the user utilises the user interface on the camera phone to select the most suitable predefined folder and stores the image in that folder.

Alternatively, the user can transfer any captured images to an external storage device, such as a personal computer, and arrange and store the images on the other device.

Similar methods are also used to arrange images captured on other image capturing devices such as a digital camera or a computer with a camera function.

The present methods for arranging and storing images on a camera phone are onerous for the user as they require a series of steps to be manually performed by the user after an image has been captured.

It is the aim of embodiments of the present invention to provide an improved method of handling images that at least partly mitigates some of the above problems.

SUMMARY OF INVENTION

According to one aspect of the present invention, there is provided a method of handling images in an image capturing device, the method comprising the steps of: capturing an image; enabling the image capturing device for receiving and matching a voice tag; receiving a voice tag and matching the received voice tag with a stored voice tag, the stored voice tag having an instruction associated therewith for handling an image; handling the image in accordance with the instruction corresponding to the received voice tag; and wherein the step of enabling is responsive to the step of capturing an image and the image capturing device is enabled for a predetermined period of time.

Preferably, the image capturing device comprises at least one location for storing images. The instruction may comprise one of: storing an image in the at least one location, deleting an image, marking an image for emailing, marking an image for printing.

The image capturing device may comprise memory, and the location for storing images is a location in memory.

Preferably, the step of enabling may be further responsive to inputting into the image capturing device. The inputting may be pressing a button on the image capturing device or selecting an option on the screen of the image capturing device.

Preferably, the image capturing device generates a prompt, and the prompt indicates that the image capturing device has been enabled.

The image capturing device may display at least one of the stored voice tags. Furthermore, the image capturing device may display the received voice tag.

The image capturing device may display the captured image. Or, the captured image may be displayed on a display external to the image capturing device. The image capturing device may be enabled whilst the captured image is displayed.

Preferably, the image is displayed for a predetermined period of time.

Preferably, the method further comprises storing at least one voice tag together with an associated instruction.

The method may further comprise transferring the captured image to an external storage device.

Preferably, the image capturing device is a digital camera or a camera phone.

According to a further aspect of the present invention, there is provided an image capturing device for capturing and handling images, said image capturing device comprising: image capturing means adapted for capturing an image; and processing means adapted for receiving a voice tag and matching the received voice tag with a stored voice tag, said stored voice tag having an instruction associated therewith for handling an image, and for handling the image in accordance with the instruction corresponding to the received voice tag; wherein the processing means is enabled for receiving and matching a voice tag for a predetermined period of time from the step of capturing an image.

BRIEF DESCRIPTION OF DRAWINGS

For a better understanding of the present invention reference will now be made, by way of example only, to the accompanying drawings in which:

FIG. 1 illustrates a camera phone viewed from the front in an embodiment of the invention;

FIG. 2 illustrates a camera phone viewed from the rear in an embodiment of the invention;

FIG. 3 illustrates the functional elements of a camera phone in an embodiment of the invention.

FIG. 4 illustrates an arrangement of folders in an embodiment of the invention.

DETAILED DESCRIPTION OF EMBODIMENTS

Figure 5:
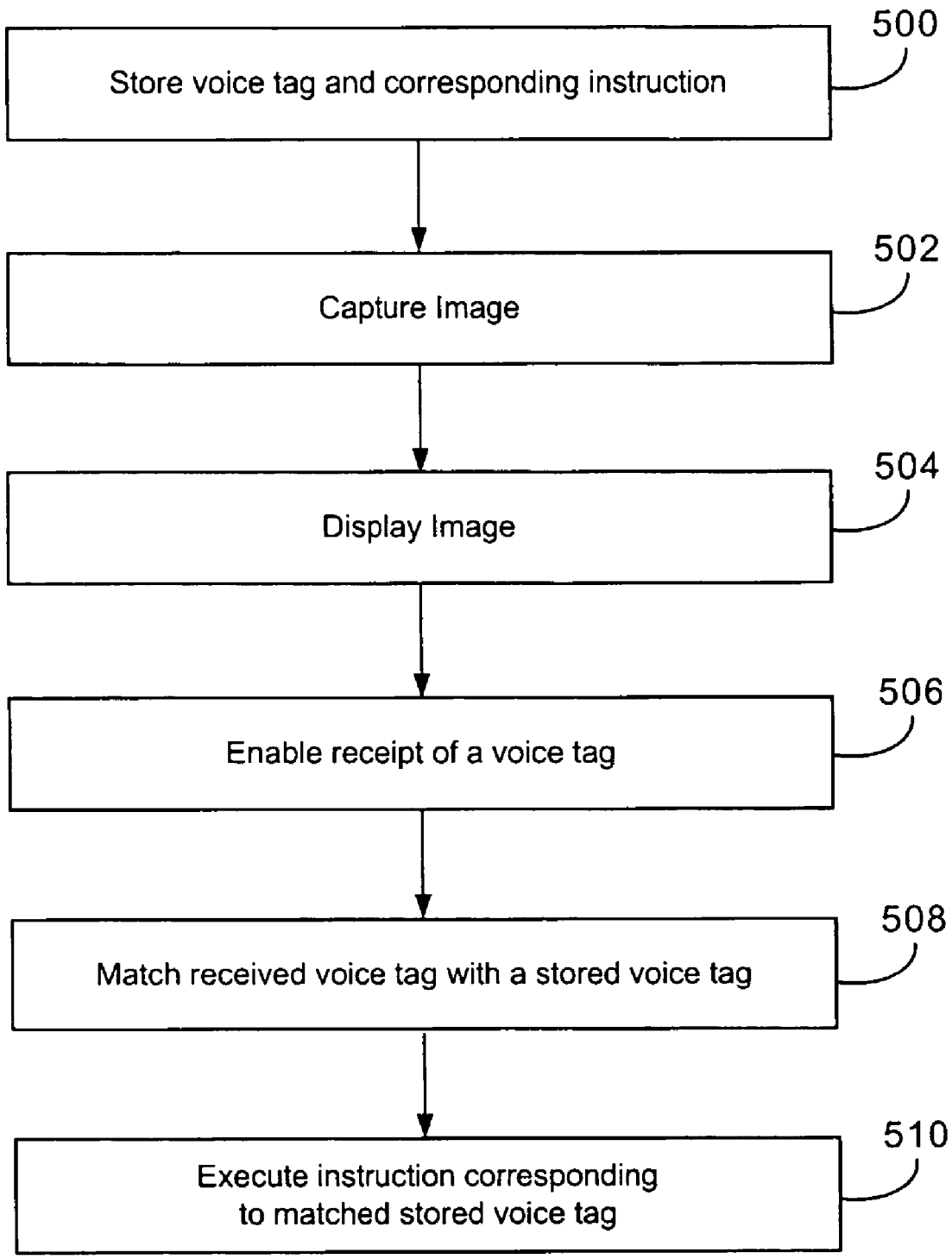
FIG. 5 illustrates a flow chart in an embodiment of the invention.

The present invention is described herein with reference to particular examples. The invention is not, however, limited to such examples. In particular, the invention is described by way of reference to an exemplary camera phone. However, the invention may be equally applicable to other suitably configured image capturing devices such as digital cameras and computers or laptops with camera functions.

FIG. 1 illustrates a camera phone 100 in an embodiment of the present invention. The camera phone 100 illustrated comprises a microphone 102 and controls 104 for inputting information such as phone numbers, text messages, control information for controlling the camera phone. The control information may be navigation commands for navigating through displayed menus, mode selecting information and the like. The camera phone 100 is also provided with screen 106 and a speaker 108. The screen 106 may be a touch screen used for inputting information, selecting options displayed on the screen and the like. Interface 110 allows the camera phone to connect to an external screen. Interface 112 allows the camera phone to connect to external storage devices, such as a personal computer. The camera phone may include other interfaces not illustrated in FIG. 1. For example, the camera phone may include an interface for connecting the camera phone to a printer for printing captured images. Furthermore, interfaces 110 and 112 may be provided as a single interface.

FIG. 2 illustrates a camera phone 100, corresponding to the camera phone 100 illustrated in FIG. 1, but viewed from the opposite side. The camera phone 100 includes a camera unit 202. The position of the camera unit in the camera phone can be varied. For example, the camera unit may be on the same side of the phone as the controls 104 and screen 106.

Whilst the camera unit 202 is illustrated in the camera phone 100 as a built-in camera unit, the camera unit 202 may be an external unit connected to the camera phone 100 via a suitable connection such as via a wired connection or a via a wireless connection, e.g. Bluetooth or any other suitable connection.

FIG. 3 illustrates the functional elements that comprise the camera phone 100. The microphone 102 illustrated in FIG. 1, is connected to a processor unit 306. The processor unit 306 is connected to memory 308. The memory may be internal memory, or some external memory, such as a memory card, memory stick or the like. The processor unit is also connected to a camera unit 304, interfaces 110 and 112, and to the screen 106. The camera unit 304 may be external to the camera phone.

The camera phone also includes circuitry 310 and associated memory 312 for processing and storing voice tags. The function of these elements will be discussed in more detail below.

The memory 308 and associated memory 312 may be separate or be the same physical memory.

When an image is captured by the camera unit 304, it is processed by the processing unit 306 and then stored in the memory 308. The image can be retrieved from the memory 308 and displayed on the screen 106.

FIG. 4 illustrates the memory 308 comprising a plurality of folders 402, 404, 406 and 408 for storing images and other data. The folders divide the memory into separate logical locations. Each folder can be created and given a label by the user and used to store data in a more convenient and logical manner. Therefore, instead of having a single "images" folder, the user can create more than one folder for storing images. For example, the user may have a folder labelled "vacation" 402, a folder labelled "work" 404, a folder labelled "friends" 406 and a folder labelled "miscellaneous" 408. Images can then be stored in each of those folders accordingly.

In a preferred embodiment of the present invention, a voice activated mechanism is used to handle and store images captured by a camera phone. Each of the folders for storing images created by the user may be assigned a voice tag. The assigned voice tags may be stored in the memory 312. Images captured by the camera phone may be stored in one of the folders. The selection of the folder may be determined by the user speaking a voice tag corresponding to an assigned voice tag. Furthermore, other functions, such as deleting an image, may be performed using a suitably assigned voice tag, such as one assigned to a delete function. This embodiment will now be described in more detail with reference to the flow chart of FIG. 5.

Firstly, the user stores a voice tag, which will typically be a word or short phrase spoken into the camera phone. The voice tag can then be assigned a corresponding instruction such as delete image, mark image for printing or for sending by email, move image to "vacation" folder or move image to "work" folder by circuitry 310. The voice tag chosen by the user may be one that gives an indication of the instruction or folder to which the image is to be moved, such as the spoken word "vacation" for moving an image into the "vacation" folder.

The voice tag may be stored in memory 312 during an initiation process, where the user selects a folder or an instruction and then records a chosen voice tag using the microphone 102. The voice tag is then saved and attached to the selected folder or instruction. The voice tags and corresponding instructions may be stored in the memory 312. This is represented by step 500 in FIG. 5.

An image is then captured using the camera phone 100 with the camera unit 304. This is represented by step 502 in FIG. 5.

After the image has been captured, the camera phone may display the captured image on the screen 106. This represented by step 504 in FIG. 5. The image is displayed for a duration that may be predetermined by settings in the camera phone. The settings may be adjusted by the user or may be set to a default value. The user can review the image whilst it is being displayed and also determine he wishes to handle it.

For the duration that the image is being displayed, or for any other predetermined period of time, which may be defined by the camera phone settings, the camera phone automatically enables the receipt of a voice tag spoken by the user. During this period, the user may speak a voice tag into the microphone unit 102. This is represented by step 506 in FIG. 5.

The camera phone may generate a prompt to notify a user that receipt of a voice tag has been enabled to notify the user. The prompt may be a visual prompt displayed on the screen, such as the message "voice tag activation enabled", or an audio prompt, such a beep or other sound generated by the camera phone. The prompt may be generated at any time after the image has been captured and may be generated by the processor unit.

The camera phone may also store a log of the voice enabled instructions. This log may be accessed at a later time to view all the instructions handled using voice tags. Some of the instructions displayed in the log may be reversible using an "undo" feature for example.

Alternatively, after an image is captured, the user may manually enable the receipt of a voice tag using the controls 104 on the camera phone. Thus, the user may press a button to activate the voice tag feature on the camera phone instead of the feature being enabled automatically after the image has been captured.

The camera phone may generate a prompt to notify the user to manually enable receipt of a voice tag. This prompt may be generated by the processor unit. For example, the camera phone may display the message "Press # to enable receipt of voice tag" or generate an audio prompt such as a beep or other sound.

The circuitry 310 then matches the received voice tag spoken by the user with one of the stored voice tags from the memory 312. This is represented by step 508 in FIG. 5.

When a matching stored voice tag is found, the circuitry 310 executes the instruction corresponding to the matched voice tag stored. This is represented by step 510 in FIG. 5.

Once handling of the image is complete, the camera phone can capture a new image.

For example, the user may capture an image of a sunset whilst on vacation. The image of the sunset will be displayed on screen 106 of the camera phone 100 for a predetermined duration. During this period the camera phone 100 is enabled to receive a voice tag spoken by the user. The user may decide to store the image of the sunset in the "vacation" folder, and can do so by simply speaking the word "vacation" into the microphone 102 of camera phone 100. The processing unit 306 matches the spoken voice tag "vacation" with the stored voice tag "vacation". The stored voice tag is also stored with a corresponding instruction, in this example, move to "vacation" folder. Therefore, the image of the sunset is moved into the "vacation" folder by the processing unit 306.

The storing of voice tags and corresponding instructions may be implemented in the same manner as the voice dialling feature already present on some mobile phones, where a user records a keyword and assigns that keyword to a telephone number in the phone memory. The user can then speak the keyword corresponding to a number to dial that number. However, the present invention is not limited to voice dialling or mobile phones. This invention is equally applicable to any image capturing device with voice control.

In the preferred embodiment of the voice tag implementation the user may record a voice tag and assigns it to an instruction or location of a folder in the camera phone. This is done by first selecting an instruction or file folder then selecting an option to start recording a voice tag using the controls 104 on the camera phone 100. The voice tag may be a short sound or noise. The recording of a voice tag may be performed after selected a suitable option using the user interface on the camera phone. The recording of the voice tag may be performed by circuitry 310 and stored in memory 312. Since the option for recording a voice tag is accessed by first selecting an instruction or file folder, the recorded voice tag is automatically associated with the instruction or file folder, and may be stored in the memory 312.

Receipt of a voice tag may then be enabled when:
1. The user presses a dedicated enable voice tag key or selects a suitable menu option on the camera phone 100 using the controls 104; or
   the user presses a key dedicated for some other function for a predetermined period of time (e.g. 2–3 seconds) on the controls 104. A normal key press may activate a first function and a long key press may enable receipt of a voice tag; or
   the camera phone automatically enables receipt of a voice tag in response to capturing an image as described above.
2. The camera phone may notify the user that receipt of a voice tag is enabled: this may be done by showing a suitable message on the screen 106. For example, the message may read "please speak now".
3. The user speaks a short phrase or word.
4. The circuitry 310 in the camera phone compares the received phrase or word against all the voice tags stored in the camera phone's memory 312.
5. When a match is found, the stored instruction is preformed and a confirmation may be shown to the user on the screen 106 of the camera phone 100.

In preferred embodiments of the present invention receipt of a voice tag is automatically enabled without the user having to press any keys or buttons before speaking the short phrase or voice tag. In voice dialling systems, the receipt of a voice tag for voice dialling is only enabled after the user presses a button to activate voice dialling.

In another embodiment of the present invention, the camera phone allows the user to browse and categorise the images separately. Therefore, instead of using voice tags to handle the images immediately after an image is captured, handling may be done at a later time. For example, the user may leave the captured images unorganised until the camera phone is connected to an external display such as a large screen or monitor is available to view the images. The connection between the camera phone and the external display may be via interface 110. The user may set the camera phone to a slideshow or other similar mode where the camera phone displays on the external display each image in series. The camera phone may provide a predetermined interval between displaying each image. During the slideshow, the camera phone may enable receipt of voice tags for handling the images.

An advantage of handling the images during a slideshow using a large screen or monitor, such as TV screen or computer monitor, is that it allows the camera phone to display some or all of the stored voice tags as a prompt to remind the user of the voice tags available. The voice tags displayed may also include the folder names or the instruction names that correspond to the voice tags. This option for displaying the voice tags may be configurable. Furthermore, the displaying of the voice tags may also be performed on the screen of the camera phone.

After the camera phone has received a voice tag and matched it against a stored voice tag, the matched voice tag may be displayed on the screen for a predetermined period of time, for example 0.5–1 second, to allow the user to check that the correct voice tag was matched.

The actions that the end user can perform are not limited to the camera phone. Since most users store captured images on another storage device, such as a personal computer, and frequently transfer the images from the camera phone to the other storage device via interface 112.

The voice tag system described above may be extended to include the folder structure in the storage device. This may be realised during the image transfer process, by synchronizing the folder structure of the storage device to the camera phone, and then recording voice tags in the camera phone corresponding to the folders in the synchronized folder structure.

In the previous systems, a button needs to be pressed before the mobile phone starts "listening" for a keyword or voice tag, otherwise the processing unit in the phone will constantly be active, which consuming valuable battery power. Furthermore, if the phone is constantly listening for a keyword, it is likely that the phone may accidentally receive and match a keyword that was unintentionally spoken by the user.

Embodiments of the present invention provide an enhanced method for handling images in camera phones using voice tags, where the camera phone knows exactly when the voice tag is going to be spoken and received. The period during which the voice tag could be received may be the same as the period during which a captured image is displayed. Therefore, the user can review a captured image on the display of the device, determine how he wishes to handle the image, and then speak a keyword or voice tag corresponding to an instruction for handling the image without the need to press any buttons or access any user interfaces.

In embodiments of the present invention, it is not necessary to arrange and store images using the user interface of the camera phone or to transfer the images to an external device for handling.

Furthermore, embodiments of the present invention offer the advantage of the user not having to press any buttons or manipulate the camera phone to enable receipt of a voice tag for handling a captured image.

It will be appreciated that whilst the embodiments are described in relation to a camera phone, the present invention is equally applicable to other image capturing devices such as digital cameras, PDAs with camera functions and other suitably configured devices.

It will also be appreciated that whilst the processing unit for capturing images and circuitry for managing voice tags have been described as separate elements, both could be implemented using a single suitably configured processing unit.

Furthermore, whilst voice tags have been described as words or short phrases spoken by the user, any sound made by the user may be used. For example, the sound of a hand clap or a whistle could just as easily be used instead of a spoken word or phrase.

It is also noted that while the above describes exemplifying embodiments of the invention, there are several variations of modifications which may be made to the prescribed embodiments without departing from the scope of the present invention as defined in the appended claims. One skilled in the art will recognise modifications to the prescribed embodiments.

The invention claimed is:

1. A method of handling images in an image capturing device, the image device comprising locations for storing images, said method comprising the steps of:
    capturing an image;
    enabling the image capturing device for receiving and matching a voice tag;
    receiving a voice tag and matching the received voice tag with a stored voice tag, said stored voice tag having an instruction associated therewith specifying one of the locations for storing an image;
    storing the image in the specified location in accordance with the instruction corresponding to the received voice tag; and
    wherein the step of enabling is responsive to the step of capturing an image and the image capturing device is enabled for a predetermined period of time.

2. A method as claimed in claim 1, wherein the image capturing device comprises memory comprising the locations.

3. A method as claimed in claim 1, wherein the step of enabling is further responsive to inputting into the image capturing device.

4. A method as claimed in claim 3, wherein the inputting is one of:
    pressing a button or selecting an option on a screen of the image capturing device.

5. A method as claimed in claim 1, wherein the image capturing device generates a prompt, said prompt indicating the enabling of the image capturing device.

6. A method as claimed in claim 5, wherein the image capturing device displays at least one of the stored voice tags.

7. A method as claimed in claim 6, wherein the image capturing device displays the received voice tag.

8. A method as claimed in claim 7, wherein the method further comprises a step of displaying the captured image on the image capturing device.

9. A method as claimed in claim 8, wherein the image capturing device is enabled whilst displaying the captured image.

10. A method as claimed in claim 9, wherein the image is displayed for a predetermined period of time.

11. A method as claimed in claim 7, wherein the method further comprises a step of displaying the captured image on a display external to the image capturing device.

12. A method as claimed in claim 1, wherein the method further comprises storing at least one voice tag together with an associated instruction.

13. A method as claimed in claim 1, wherein the method further comprises transferring the image to an external storage device.

14. A method as claimed in claim 1, wherein the image capturing device is a digital camera or a camera phone.

15. An image capturing device for capturing and handling images, said image capturing device comprising:
    locations for storing images:
    image capturing means adapted for capturing an image; and
    processing means adapted for receiving a voice tag and matching the received voice tag with a stored voice tag, said stored voice tag having an instruction associated therewith specifying one of the locations for storing an image, and for storing the image in the specified location in accordance with the instruction corresponding to the received voice tag;
    wherein said processing means is enabled for receiving and matching a voice tag for a predetermined period of time from the step of capturing an image.

16. An image capturing device as claimed in claim 15 further comprising memory comprising the locations.

17. An image capturing device as claimed in claim 15, further comprising input means and wherein the processing means is enabled for receiving and matching the voice tag by an input via the input means.

18. An image capturing device as claimed in claim 17, wherein the input means is one of: buttons or a touch screen.

19. An image capturing device as claimed in claim 15, wherein the processing means is further adapted for generating a prompt, said prompt indicating the enabling of the image capturing device.

20. An image capturing device as claimed in claim 19, wherein the processing means is further adapted for displaying at least one of the stored voice tags on the image capturing device.

21. An image capturing device as claimed in claim 20, wherein the processing means is further adapted for displaying the received voice tag.

22. An image capturing device as claimed in claim 15 further comprising displaying means, wherein the processing means is further adapted for displaying the captured image on displaying means.

23. An image capturing device as claimed in claim 15, wherein the image capturing device comprises means for connecting to external displaying means and wherein the processing means is adapted for displaying the captured image on the external displaying means.

24. An image capturing device as claimed in claim 23, wherein the image capturing device is enabled whilst displaying the captured image.

25. An image capturing device as claimed in claim 24, wherein the processing means is further adapted for displaying the captured image for a predetermined period of time.

26. An image capturing device as claimed in claim 15, wherein the memory is adapted to store at least one voice tag together with an associated instruction.

27. An image capturing device as claimed in claim 15 further comprising means for transferring the image to an external storage device.

28. An image capturing device as claimed in claim 15, wherein the image capturing device is a digital camera or a camera phone.

* * * * *